United States Patent
Chauvel et al.

(10) Patent No.: US 6,282,706 B1
(45) Date of Patent: Aug. 28, 2001

(54) CACHE OPTIMIZATION FOR PROGRAMMING LOOPS

(75) Inventors: Gerard Chauvel, Antibes (FR); Marion C. Lineberry, Dallas, TX (US); Matthew A. Woolsey; Michael McMahon, both of Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/021,241

(22) Filed: Feb. 10, 1998

(51) Int. Cl.[7] .................................................... G01F 9/45
(52) U.S. Cl. .................... 717/9; 717/5; 717/7; 711/100; 703/6; 703/16
(58) Field of Search ....................... 395/709, 706, 395/705; 717/9, 5; 711/3, 100; 703/13

(56) References Cited

U.S. PATENT DOCUMENTS

| | | | |
|---|---|---|---|
| 4,701,844 | * 10/1987 | Thompson et al. | 711/119 |
| 5,303,377 | * 4/1994 | Gupta et al. | 717/9 |
| 5,452,457 | * 9/1995 | Alpert et al. | 717/7 |
| 5,530,964 | * 6/1996 | Alpert et al. | 717/7 |
| 5,546,559 | * 8/1996 | Kyushima et al. | 711/113 |
| 5,704,053 | * 12/1997 | Santhanam | 712/207 |
| 5,875,464 | * 2/1999 | Kirk | 711/129 |
| 5,889,996 | * 1/2000 | Adams | 717/5 |
| 5,892,940 | * 4/1999 | Mangelsdorf | 717/10 |
| 5,910,900 | * 6/1999 | Mangelsdorf | 703/6 |
| 5,920,485 | * 7/1999 | Mangelsdorf | 717/5 |
| 5,926,395 | * 7/1999 | Mangelsdorf | 703/15 |
| 5,949,990 | * 9/1999 | Mangelsdorf | 703/14 |
| 5,953,531 | * 9/1999 | Megiddo et al. | 717/9 |
| 5,956,498 | * 9/1999 | Mangelsdorf | 717/8 |
| 6,012,836 | * 1/2000 | Mangelsdorf | 703/6 |
| 6,129,458 | * 10/2000 | Waters et al. | 711/133 |

OTHER PUBLICATIONS

Li, W.; "Compiler Cache Optimizations for Banded Matrix Problems". ACM Digital Library[online]. Proceedings of the 9th ACM International Conference on Supercomputing, pp 21–30, Jul. 1995.*

Kennedy et al.; "Optimizing for Parallelism and Data Locality". Proceedings of the 1992 International Conference on Supercomputing, pp 323–334, Jul. 1995.*

Yamada et al.; "Data Relocation and Prefetching for Programs with Large Data Sets". IEEE/IEE Electronic Library [online], Proceedings of the 27th Annual International Symposium on Microarchitecture, pp. 118–127, Nov. 1994.*

Temam et al.; "Software assistance for data caches". IEEE/IEE Electronic Library[onlin], Proceedings from the First IEEE Symposium on High–Performance Computer Architecture, pp. 154–163, Jan. 1995.*

(List continued on next page.)

Primary Examiner—James P. Trammell
Assistant Examiner—Kelvin Booker
(74) Attorney, Agent, or Firm—Ronald O. Neerings; Frederick J. Telecky, Jr.

(57) ABSTRACT

A cache memory architecture 50, which may be, for example, a set associative cache memory, has a cache controller (52) with an internal register for storing the address of the active line currently latched in the output buffer of the high speed cache data array (56) which stores the cached data values from the main memory. If a memory access request specifies an address which would be contained in the active line, the cache look-up mechanisms are disabled and the data is taken from the output buffer. The efficiency of the cache can be increased by linking a program to memory such that the number of cache lines used by one or more program loops are minimized.

20 Claims, 5 Drawing Sheets

OTHER PUBLICATIONS

Stolberg et al.; "Code positioning to reduce instruction cache misses in signal processing applications on multimedia RISC processors". IEEE/IEE Electronic Library[online], International Conference on Acoustics, Speech, and Signal Processing, pp. 699–702, Apr. 1997.*

Gosmann et al.; "Code Reorganization for Instruction Caches". IEEE/IEE Electronic Library[online], Proceedings of the Twenty–Sixth Hawaii International Conference on System Sciences, vol. 1, pp. 214–223, Jan. 1993.*

Kandemir, et al.; "A Compiler Algorithm for Optimizing Locality in Loop Nests". ACM Digital Library[online], ICS 97, pp. 269–276, May 1997.*

Xia et al.,; "Instruction Prefetching of Systems Codes With Layout Optimized for Reduced Cache Misses". Proceedings of the 23rd annual ISCA, pp. 271–282, May 1996.*

Carr et al.; "Compiler Optimizations for Improving Data Locality". ACM Digital Library[online], vol. 29, No. 11, pp. 252–262, Nov. 1994.*

Lo et al,; "Improving Balanced Scheduling with Compiler Optimizations that Increase Instruction–Level Parallelism". ACM Digital Library[online], Proceedings of the 1995 PLDI, vol. 30, No. 6, pp. 151–162, Jun. 1995.*

Nanri et al.; "Using Cache Optimizing Compiler for Managing Software Cache on Distributed Shared Memory System". IEEE/IEE Electronic Library[online], 1997 Conference on High Performance Computing on the Information SuperHighway, pp. 312–318, Apr. 1997.*

Goto et al.; "Design and Performance of a Coherent Cache for Parallel Logic Programming Architectures". ACM Digital Library[online], The 16th Annual ISCA, pp. 25–33, May 1989.*

Muchnick, S.; Advanced Compiler Design and Implementation. San Francisco, CA, Morgan Kaufmann Publishers, chapter 20, Nov. 1997.*

Kuroda et al.; "A Knowledge–Based Retargetable Compiler for Aplication Specific Signal Processors". IEEE/IEE Electronic Library[online], 1989 IEEE ISCS, vol. 1, pp. 631–634, May 1989.*

Kuroda et al.; "A Knowledge–Based Compiler Enhancing DSP Internal Parallelism". IEEE/IEE Electronic Library, 1991 IEEE ISCS, vol. 1, pp. 236–239, Jun. 1991.*

* cited by examiner

|     |      |      |       |       |
|-----|------|------|-------|-------|
| n   | ✕    | ✕    | inst1 | inst2 |
| n+4 | inst3 | inst4 | inst5 | inst6 |
| n+8 | inst7 | ✕    | ✕    | ✕    |

|     |      |      |       |       |
|-----|------|------|-------|-------|
| n   | ✕    | ✕    | —     | —     |
| n+4 | inst1 | inst2 | inst3 | inst4 |
| n+8 | inst5 | inst6 | inst7 | ✕    |

|     |      |      |       |       |
|-----|------|------|-------|-------|
| n   | ✕    | inst1 | inst2 | inst3 |
| n+4 | inst4 |      |       |       |
|     |      |      |       |       |

|     |      |      |       |       |
|-----|------|------|-------|-------|
| n   | ✕    | —    | —     | —     |
| n+4 | inst1 | inst2 | inst3 | inst4 |

CACHE OPTIMIZATION FOR PROGRAMMING LOOPS

CROSS-REFERENCE TO RELATED APPLICATIONS

This application is related U.S. Ser. No. 08/995,600 entitled "Mobile Communication System with Cross Compiler and Cross Linker" to Woolsey et al, U.S. Ser. No. 08/995,597, entitled Method and Apparatus for Providing Downloadable Functionality to an Embedded Coprocessor"to Brewer, U.S. Ser. No. 08/995,603, entitled Method and Apparatus for Extending Security Model to Native Code" to Brewer, and U.S. Ser. No. 08/995,606, entitled "Mobile Information Services Platform" to McMahon et al, all filed on Dec. 22,1997 and incorporated by reference herein.

STATEMENT OF FEDERALLY SPONSORED RESEARCH OR DEVELOPMENT

Not Applicable

BACKGROUND OF THE INVENTION

1. Technical Field

This invention relates in general to electronic devices and, more particularly, to a method and apparatus for increasing the efficiency of a cache memory.

2. Description of the Related Art

Most modern day processing devices utilize a cache memory to increase processing speed. A cache memory acts as an intermediary between a processing circuit, such as a general purpose processor or a digital signal processor, and a memory bank, typically a dynamic random access memory (DRAM). The cache memory, typically a static random access memory (SRAM), is generally significantly smaller than the main memory bank (in terms of storage capacity), but significantly faster. The cache memory retains a portion of the data in the memory bank. When the processor accesses data, the cache memory is checked first to see if the data resides in the cache; if so, a "cache hit" ensues and data is taken from the cache memory which can supply the data at high speed responsive to the memory access request. On the other hand, if the data does not reside in the cache; if so, a "cache miss" ensues and data is taken from the memory bank. After a cache miss, the processor will generally be forced to wait for several clock cycles while the data is retrieved from the memory bank.

Cache architectures often have hit rates in the 90–95% rates, depending upon the application. The actual efficiency depends upon a number of factors, including the caching scheme employed, the size of the cache, and the application being run by the processor. Cache memories thus allow slower, less expensive, memory to store a large amount of data, while storing the portion of the data most likely to be accessed in the high speed cache memory.

While caches have significantly increased the speed at which data can be retrieved from the memory bank, cache architectures themselves can be slow relative to the capabilities of high speed processors. Further, a cache memory dissipates significant amounts of power, which is a particular concern to mobile electronic devices. Therefore, a need has arisen for a high speed, low power, cache architecture.

BRIEF SUMMARY OF THE INVENTION

In the present invention, a method and apparatus for executing a program in a processing circuit is shown, where the processing circuit includes a main memory and a cache memory and the cache memory comprises a plurality of data lines, each data line storing a plurality of data words. One or more programming loops are identified within the program. The loops are linked to the main memory such that a minimum number of cache lines are used to store the programming loops.

The present invention provides significant advantages over the prior art. First, significant amounts of energy can be saved by reducing tag searches and data array accesses by minimizing cache lines. Second, the speed can be significantly enhanced by reducing memory accesses. Third, cache misses can be reduced.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–9 of the drawings, like numerals being used for like elements of the various drawings.

Figure 1:
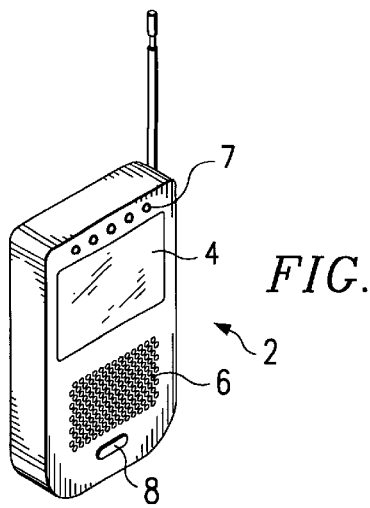
FIG. 1 illustrates a perspective view of a smartphone.

FIG. 1 illustrate a Smartphone 2 which combines the ability for wireless transmission of voice and data along with processing capabilities similar to a personal digital assistant (PDA) or mobile computer. Smartphone 2 includes a display 4, speaker 6, keyboard 7 and microphone 8.

Figure 2:
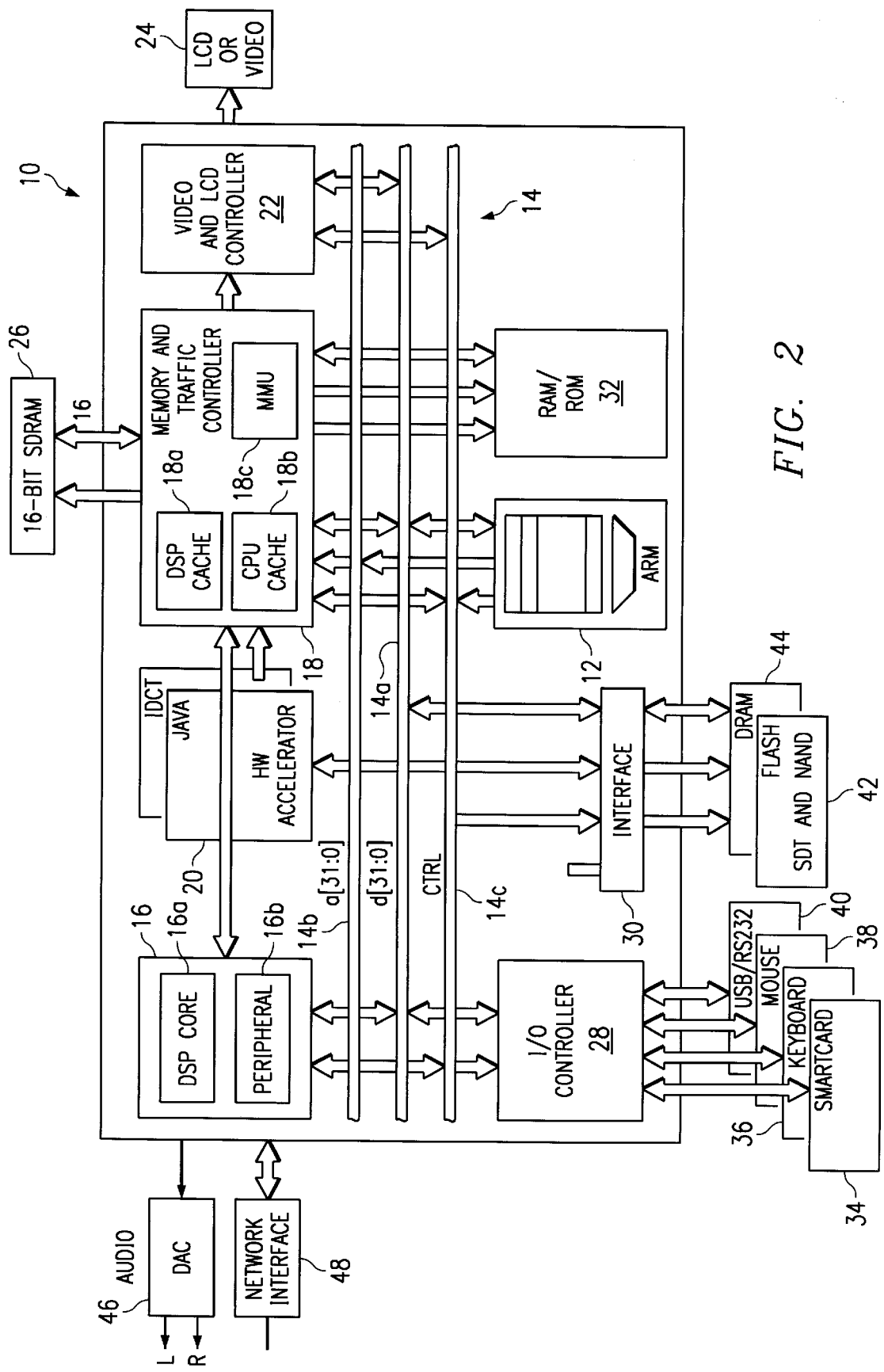
FIG. 2 illustrates a block diagram of an mobile electronic device architecture which could be used in the smartphone of FIG. 1 or other mobile electronic devices.

FIG. 2 illustrates an exemplary embodiment of a general wireless data platform architecture, which could be used for example, in the implementation of Smartphone 2, a PDA, or other mobile electronic device. The wireless data platform 10 includes a general purpose (Host) processor 12 coupled to bus structure 14, including data bus 14$a$, address bus 14$b$ and control bus 14$c$. One or more DSPs (or other coprocessors) 16, including the core processor 16$a$ and the peripheral interface 16$b$, are coupled to bus 14 and to memory and traffic controller 18, which includes a DSP cache memory 18$a$, a CPU cache 18$b$, and a MMU (memory management unit) 18$c$. A hardware accelerator circuit 20

(for accelerating a portable language such as JAVA) and a video and LCD controller 22 are also coupled to the memory and traffic controller 18. The output of the video and LCD controller is coupled to display 4.

Memory & traffic controller 18 is coupled to bus 14 and to the main memory 26, shown as an SDRAM (synchronous dynamic random access memory). Bus 14 is also connected to I/O controller 28, interface 30, and RAM/ ROM 32. A plurality of devices could be coupled to the wireless data platform 10, such as smartcard 34, keyboard 36, mouse 38, or one or more serial ports 40, such as a USB (universal serial bus) port or an RS232 serial port. Interface 30 can couple to a flash memory card 42 and/or a DRAM card 44. The peripheral interface 16b can couple the DSP 16 to a DAC (digital to analog converter) 46, a network interface 48 or to other devices.

In the preferred embodiment, the wireless data platform 10 of FIG. 2 utilizes both a general purpose processor 12 and a DSP 16. Unlike current devices in which the DSP 16 is dedicated to specific fixed functions, the DSP 16 of FIG. 2 can be used for any number of functions. This allows the user to derive the full benefit of the DSP 16.

One main area in which the DSP 16 can be used is in connection with the man-machine interface (MMI). Importantly, functions like speech recognition, image and video compression and decompression, data encryption, text-to-speech conversion, and so on, can be performed much more efficiently using the DSP 16. The present architecture allows new functions and enhancements to be easily added to wireless data platform 10.

It should be noted that the wireless data platform 10 is a general block diagram and many modifications could be made. For example, FIG. 2 illustrates separate DSP and processor caches 18a and 18b As would be known to one skilled in the art, a unified cache could also be used in an alternative embodiment. Further, the hardware acceleration circuit 20 is an optional item. Such devices speed the execution of languages such as JAVA; however, the circuit is not necessary for operation of the device. Further, although the illustrated embodiment shows a single DSP, multiple DSPs (or other coprocessors) could be coupled to the buses.

Figure 3:
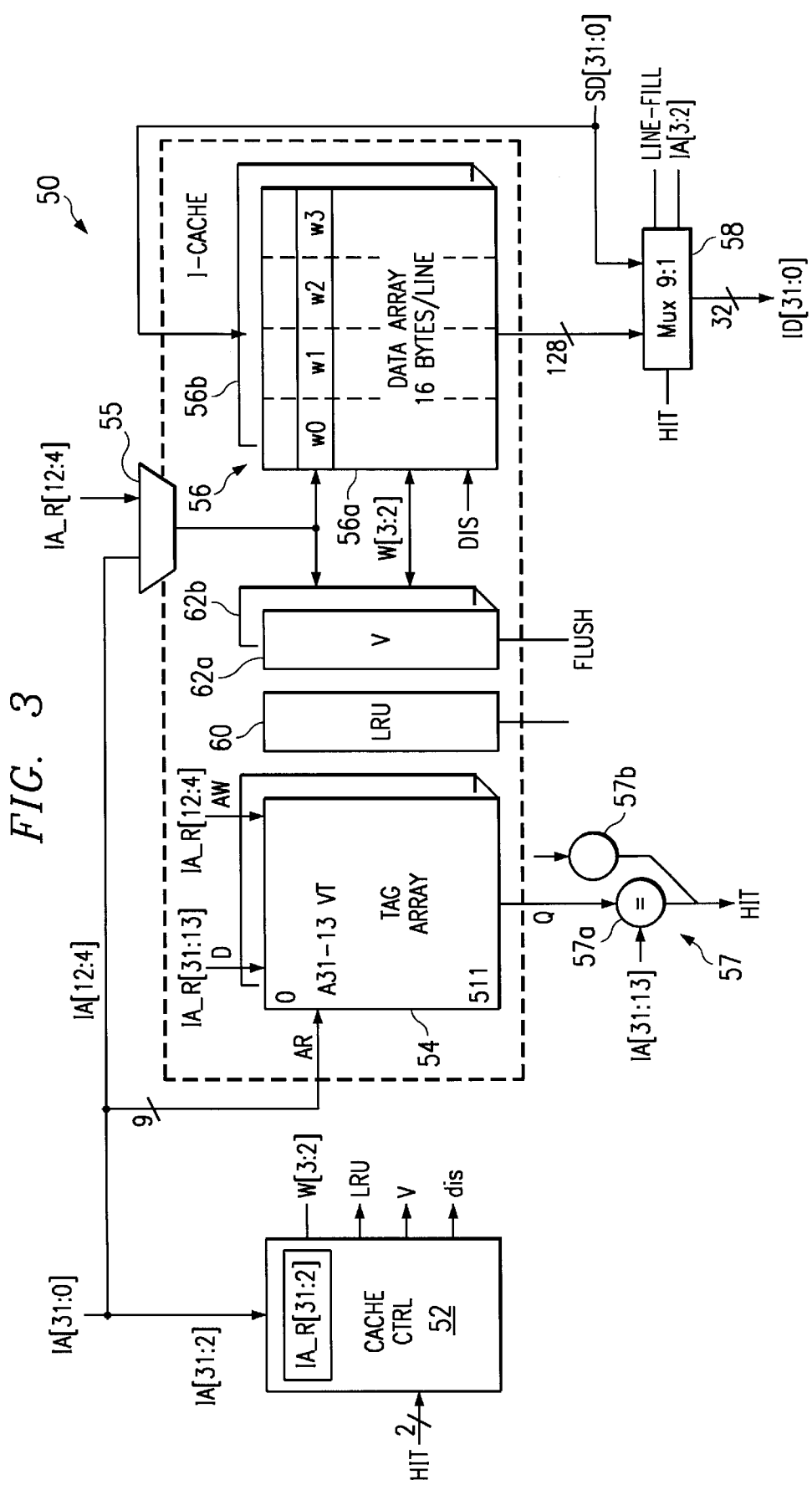
FIG. 3 illustrates a block diagram of a cache architecture which could be used in the mobile electronic device architecture of FIG. 2 and in other processing devices.

FIG. 3 illustrates a cache architecture 50 which can greatly increase the efficiency and speed of a cache memory. While this cache architecture is specifically shown for the instruction cache, it should be noted that the cache architecture 50 could be used for a data cache or a unified data/instruction cache (with minor modifications) as well. Further, this cache architecture could be used in conjunction with any processing device which would benefit from a cache memory, including smartphones, PDAs, palmtop computers, notebook computers, desktop computers and so on.

In the cache architecture 50, a cache controller 52 receives a memory address, in this case a 32-bit instruction address, IA[31:2], where "[31:2]" indicates that the cache controller is receiving bits "2" through "31" of the 32-bit address. The 32-bit address corresponds to an addressable memory space of $2^{32}$=4 Gigabytes or 1 Gigawords (where a word is set to four bytes). The cache controller 52 is coupled to a tag array 54 and a data array 56. The illustrated cache architecture is arranged as a two-way set associative cache; therefore, both the tag array and the data array have two memory planes, 54a–b and 56a–b, respectively. In the illustrated embodiment, each plane 54a–b of the tag array is arranged as a 512×20 memory array. The outputs of planes 54a and 54b are output to respective comparators 57a and 57b. IA[31:13] are also coupled to both comparators 57a and 57b. Each comparator 57a and 57b generates a one-bit output, combined to form a two-bit HIT signal. The tag array 54 is an asynchronous dual port memory where Q is the output data bus, AR is the address read bus, D is the input data bus and AW is the address write bus. The IA[12:4] signal is connected to AR.

Similarly, each plane 56a–b of the data array is arranged as 512×128. Each of the 128-bit lines is addressable as four words by bits IA[12:4]. Each word in a line is addressable individually by IA[3:2]. The output of each data array 56 is coupled to multiplexer 58, along with the output of a main memory SD[31:0] (which provides the data in the instance HIT="00"). The multiplexer 58 is shown as a 9:1 multiplexer which selects between four 32-bit words from the first plane of tag memory 56a, four 32-bit words from the second plane of tag memory 56b and one 32-bit word from the main memory. The output of multiplexer 58 is controlled by IA[3:2] (which indicates the selected word in the line), the 2-bit HIT signal (which indicates which plane 56a or 56b had the hit) from the comparators 57 an the fill-line signal (which indicates that the word comes from the main memory due to a miss). Following a miss, words are presented to the processor on the fly. Thus, if a miss accesses the first word of a line, the processor does not need to wait until the end of the line load.

In addition, a least recent unit (LRU) 60 and valid bit arrays 62a–b are coupled to the tag array 54.

Cache controller 52 has an internal register 64, which stores the address of the "active" line, which is the line of data available in the output buffer of the data array 56 (IA_R[32:2]). The cache controller 52 outputs a disable signal if the requested address is equal to the address in register 64 (i.e., IA[31:2]=IA_R[32:2]). This aspect will be discussed in greater detail hereinbelow.

It should be noted that the particular structure of the cache 50 (i.e, two-way set associative), sizes of the tag and data arrays, and of the instruction address are for illustrative purposes only.

In a set associative cache, each memory location in the main memory (the "main memory" is the memory whose data is cached by the cache architecture) corresponds to an address in the data array. Since the data array is generally much smaller than the main memory, each address in the data array is mapped to many addresses in the main memory. Data from a specific memory address can exist in any one of the sets of the associative cache.

The operation of a set associative cache is well known in the art and is summarized herein below for a read operation. When an address IA[31:0] is received for a memory access, IA[12:4] are used as an address into each plane 54a and 54b of the tag array 54. Each plane of the tag array 54 outputs high order bits A[31:13] responsive to the address. A[31:13] identify which address in the main memory currently has its data stored in the respective plane 54a-b. A[31:13] from each plane 54a and 54b is compared in respective comparator 57a and 57b with the high order bits of the current address IA[31:13]. If the high order addresses match in one of the planes (a cache hit), then the data for that memory address can be retrieved from the corresponding data array; if there is no match (a cache miss), the data must be retrieved from the main memory. Each memory address in the tag memory has a corresponding valid bit. These bits indicate whether the data at the corresponding location in the cache is valid. The LRU 60 determines which set is updated after a cache miss.

The cache architecture 50 includes a disable feature which can significantly improve the efficiency of the operation of the cache. The incoming address IA[31:4] is compared with the corresponding bits of the address of the active line (i.e., the address of the data currently available in the embedded latches of the memory output buffer). If these addresses are equal, the steps of accessing the tag array 54 and data array 56 can be eliminated, since it is known that the requested data is currently ready for output through the multiplexer 58. IA[3:2] provide the information to the multiplexer 58 to retrieve the desired word from the active line.

It should be noted that, in the illustrated embodiment, the output buffers of the tag arrays provide the storage device for maintaining the data of the active line; alternatively, an external memory could be provided, such as an input buffer on the multiplexer 58, to store the active line.

Figure 4:
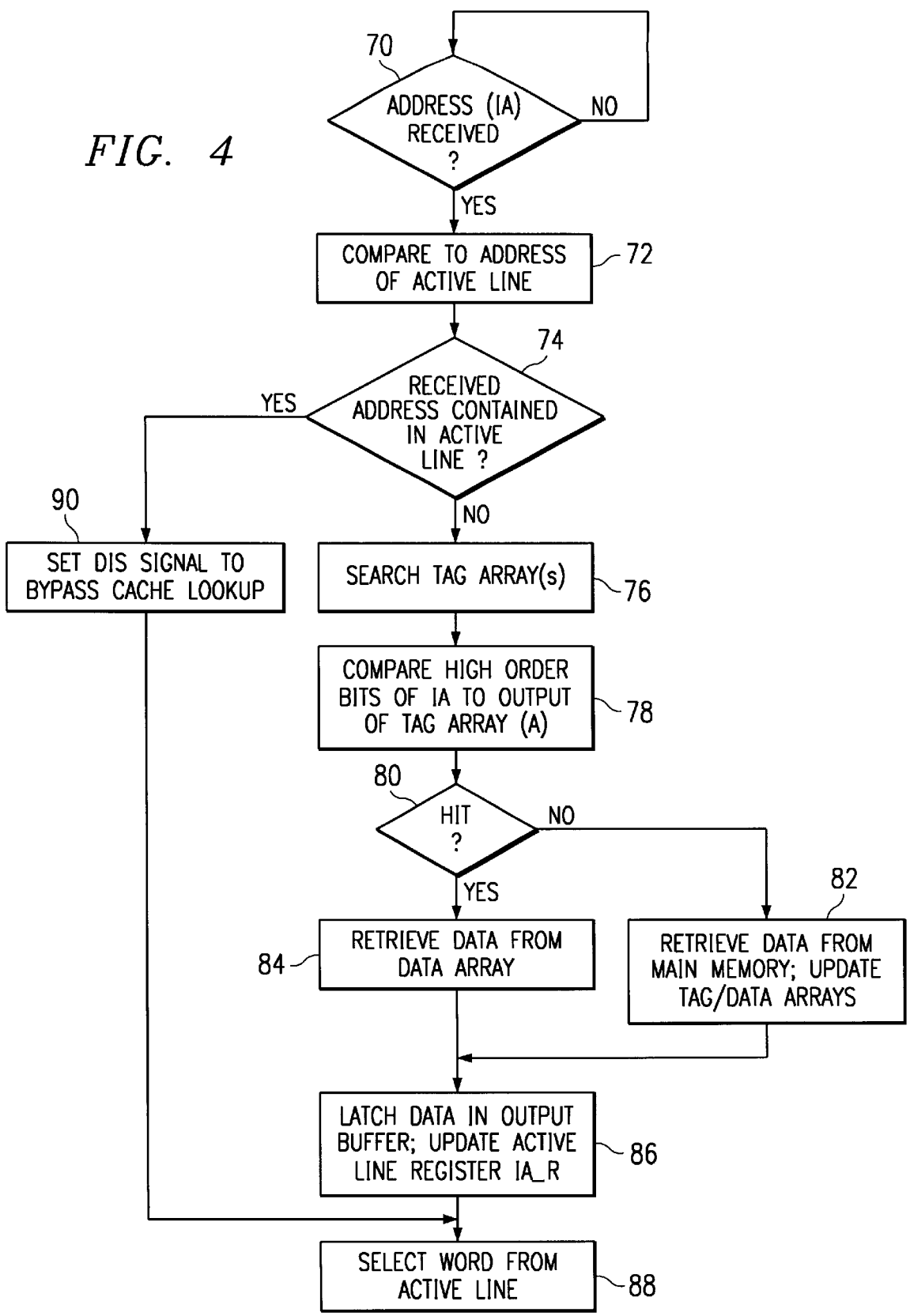
FIG. 4 illustrates a flow diagram describing the operation of the cache architecture of FIG. 3.

A flow chart describing operation of the cache architecture 50 is shown in FIG. 4. In block 70, an address (IA) is received for a data read access. The relevant bits of IA (bits [31:4] in the illustrated example) are compared to the corresponding bits of the address of the active line in the output buffer of the memory in block 72. If the bits do not match in decision block 74, i.e., the requested data is not stored in the output buffer of the data array 56 of the cache memory, then the tag arrays 54a–b are accessed with the appropriate bits in block 76. The outputs of the tag arrays 54 are compared with the high order bits of the IA address to determine if there is a cache hit in blocks 78 and 80. If there no hit or if the valid bit indicates that the data is dirty, then the data is retrieved from main memory in block 82 and the data and tag arrays are updated to store the data from main memory in the cache. Multiplexer 55 selectively switches between the IA[12:4] signal and the IA_R[12:4] signal. After a cache miss, IA_R is used to keep the address stable for the duration of the line load from main memory, since IA can point to an address outside the range of the line before the line is completely loaded. IA_R[31:13] (coupled to D) and IA_R[12:4] (coupled to AW) are used to update the tag array after a miss.

If there is a hit in decision block 80, then, in block 84, the line of memory which includes the requested data is retrieved from data array 56, responsive to the low order address bits IA[12:4]. This line is latched into the output buffer and the address of the active line is updated in the active line register 64 in block 86. The word addressed by IA[31:2] is then passed through the multiplexer 58 responsive to the IA[3:2] bits and the HIT signal in block 88.

On the other hand, if the IA address points to data which is part of the active line in block 74, then the disable (DIS) signal is set in block 90. This signal stops the tag array and data array access and causes the data to be taken from the active line currently stored in the output buffer of the memory array. Consequently, when DIS is enabled, steps 76–86 can be bypassed. Therefore, the energy used to access the tag array 54 and the data array 56 is conserved as these systems are disabled.

The disabling of the cache provides significant advantages. First, many operations can be eliminated when the requested data is available from the active line in the output buffer. For mobile electronic devices, this can lead to significant power savings by reducing memory accesses to the tag and data arrays 54 and 56. Secondly, the data can be immediately taken from the output buffer of the data array for a faster response.

Since the data array stores multiple words in each line, there is a substantial likelihood that successive reads will be from the same line as instructions are sequentially accessed. Further, if an instruction loop can be contained in a single line in the data array, data from the same active line can be read for many cycles. Therefore, a significant amount of energy and time can be saved by the present invention.

While the processor is accessing data from the write buffer of the data array 56, it can operate much faster than when the data needs to be accessed from the data array. For example, while the data array may be able to produce data at an 80 MHz rate, the processor may be able to read from the write buffer (without an access of the data array 56) at a rate of 160 MHz. Assuming an overall cache hit rate of 95%, and a cache line of eight instructions per line, then the following is true:

95% of the instructions come from the cache:
  95%*⅞ of the time, the processor can run at 160 MHz;
  95%*⅛ of the time, the processor will have a one cycle wait;
5% of the time, the processor will wait for data from main memory.

The efficiency can be further improved by increasing the number of instructions per cache line. Assuming an architecture with sixteen instructions per cache line:

95% of the instructions come from the cache:
  95%*15/16 of the time, the processor can run at 160 MHz;
  95%*1/16 of the time, the processor will have a one cycle wait;
5% of the time, the processor will wait for data from main memory.

Accordingly, the cache architecture 50 allows the processor to work at speeds greater than those achievable by the cache itself.

Figure 5:
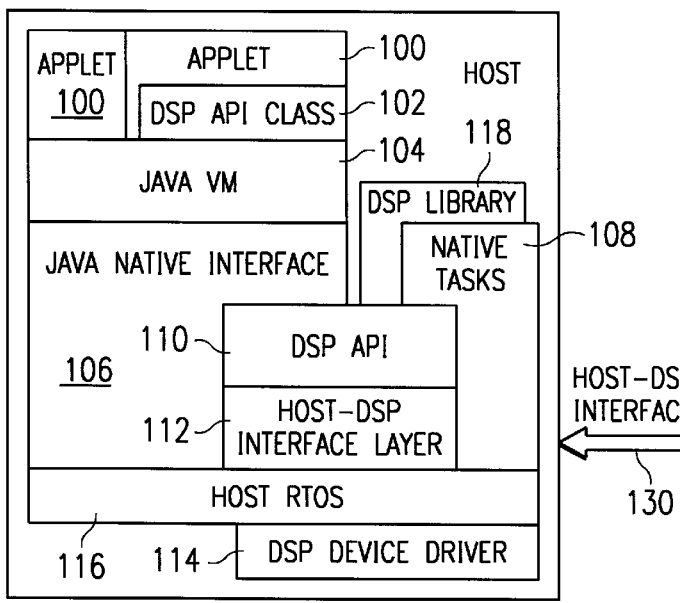
FIG. 5 illustrates an example of a functional block diagram of the platform of FIG. 1.

FIG. 5 illustrates a functional software architecture for a wireless data platform 10 which can increase the efficiency of the cache architecture 50. This software architecture is described in greater detail in conjunction with and U.S. Ser. No. 08/995,606, entitled "Mobile Information Services Platform" to McMahon et al, filed Dec. 22, 1997, which is incorporated by reference herein. This block diagram presumes the use of JAVA; it should be noted that languages other than JAVA could be used as well. Functionally, the software is divided into two groups, Host processor software and DSP software. The Host software includes one or more applets 100. The DSP API class 102 is a JAVA API package for JAVA applications or applets to access the functionality of the DSP API 110 and Host DSP Interface Layer 112. A JAVA virtual machine (VM) 104 interprets the applets. The JAVA native interface 106 is the method which the JAVA VM executes host processor or platform specific code. Native tasks 108 are non-JAVA programs which can be executed by the Host processor 12 without using the JAVA native interface. The DSP API 110, described in greater detail hereinbelow, is an API (application program interface) used the Host 12 to call to make use of the capabilities of the DSP 16. The Host-DSP Interface Layer 112 provides an API for the Host 12 and DSP 16 to communicate with each other, with other tasks, or other hardware using channels via the Host-DSP Communication Protocol. The DSP device driver 114 is the Host based device driver for the Host RTOS 116 (real time operating system) to communicate with the DSP 16. The Host RTOS 116 is an operating system, such as NUCLEUS PLUS by Accelerated Technology Incorporated. Alternatively a non-real time operating system, such as WINDOWS CE by Microsoft Corporation, could be used. The DSP Library 118 contains programs stored for execution on the DSP 16.

On the DSP side, one or more tasks 120 can be stored in memory for execution by the DSP 16. As described below, the tasks can be moved in and out of the memory as desired, such that the functionality of the DSP is dynamic, rather than static. The Host-DSP Interface layer 122 on the DSP side performs the same function as the Host-DSP Interface layer 112 on the Host side, namely it allows the Host 12 and DSP 16 to communicate. The DSP RTOS 124 is the operating system for the DSP processor. The Host Device driver 126 is a DSP based device driver for the DSP RTOS 124 to communicate with the Host 12. The Host-DSP Interface 130 couples the DSP 16 and Host 12.

In operation, the software architecture shown in FIG. 5 uses the DSP 16 as a variable function device, rather than a fixed function device as in the prior art. Accordingly, the DSP functions can be downloaded to the mobile device incorporating the architecture of FIG. 5 to allow the DSP 16 to perform various signal processing functions for the Host 12.

The DSP Library 118 contains the blocks of code that can be downloaded to the DSP 16 for execution. Each block of code will be previously unlinked, or relocatably linked as a library, so that the dynamic cross linker can resolve all address references. Each code block will also include information about the block's requirements for DSP MIPS (millions of instructions per second), priority, time slice quantum, and memory. The format for the code block header is shown in Table 1. The program memory and data memory sizes are approximations to give the Host 12 a quick check on whether the DSP can support the task's memory requirements. If there appears to be sufficient space, the dynamic cross linker can then attempt to link and load the code. It should be noted that the dynamic cross linker could still fail, due to page alignment and contiguity requirements. In the preferred embodiment, the code is in a version 2 COFF file format.

TABLE 1

Code Block Header.

| Data Type | Field Name | Description |
| --- | --- | --- |
| U16 | Processor | The target processor type. |
| T_DSP_Name | Name | Task's name. |
| U32 | MIPS | Worst case MIPS required by the task. |
| T_Size | ProgSize | Total program memory size needed. |
| T_Size | DataSize | Total data memory size needed. |
| T_Size | InFrameSize | Size of a frame in the task's input channel. |
| T_Size | OutFrameSize | Size of a frame in the task's output channel. |
| T_Size | InStrmSize | Size of the task's input stream FIFO. |
| T_Size | OutStrmSize | Size of the task's output stream FIFO. |
| U16 | Priority | Task's priority. |
| U32 | Quantum | Task's time slice quantum (number of system ticks). |
| T_Size | StackReq | Stack required. |
| T_Size | CoffSize | Total size of the COFF file. |
| T_DSP_Ptr | MsgHandler | Offset to a message handler entry point for the task. |
| T_DSP_Ptr | Create | Offset to a create entry point that is called when the task is created. |
| T_DSP_Ptr | Start | Offset to the start of the task's code. |
| T_DSP_Ptr | Suspend | Offset to a suspend entry point that is called prior to the task being suspended. |
| T_DSP_Ptr | Resume | Offset to a resume entry point that is called prior to the task being resumed. |
| T_DSP_Ptr | Stop | Offset to a stop entry point that is called prior to the task being deleted. |

TABLE 1-continued

Code Block Header.

| Data Type | Field Name | Description |
| --- | --- | --- |
| T_Host_Ptr | CoffPtr | Pointer to the location of the COFF data in the DSP Library. |

Figure 6:
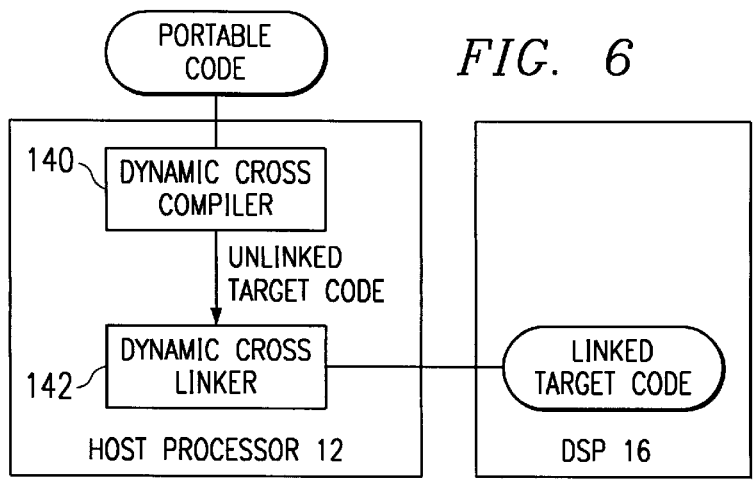
FIG. 6 illustrates a functional block diagram of dynamic cross compiling and dynamic cross linking functions.

A procedure for converting portable (processor independent) code, such as JAVA code, into linked target code is shown in FIG. 6. The procedure uses two functions, a dynamic cross compiler 140 and a dynamic cross linker 142. Each function is implemented on the host processor 12. The dynamic cross linker is part of the DSP-API in the preferred embodiment. The cross compiler may also be part of the DSP-API.

The dynamic cross compiler 140 converts portable code into unlinked, executable target processor code. The dynamic cross linker 142 converts the unlinked, executable target processor code into linked, executable target processor code. To do so, it must resolve addresses within a block of code, prior to loading on the DSP 16. The dynamic cross linker 142 links the code segments and data segments of the function, allocates the memory on the DSP 16, and loads the code and constant data to the DSP 16. The functions are referred to as "cross" compiling and "cross" linking, because the functions (compiling and linking) occur on a different processor (i.e., the host processor 12) from the target processor which executes the code (i.e., the DSP 16).

The dynamic cross compiler 140 accepts previously unlinked code loaded on demand by a user or a user agent (such as a browser). The code is processed to either (1) identify "tagged" sections of the code or (2) analyze untagged code segments for suitability of execution on the DSP 16. A tagged section of source code could delineate source targetable to a DSP by predetermined markers such as "<start DSP code>" and <end DSP code>" embedded in the source code. If a tagged section is identified either directly or through analysis, a decision is made to either cross compile or not based on the current processing state of the DSP 16. If a decision is made to compile, the section of code processed by compiling software that outputs unlinked, executable target processor code, using well known compiling methods. A decision not to compile could be made if for example, the DSP has insufficient available processing capacity (generally stated as available MIPS-million of instructions per second) or insufficient available memory, due to other tasks being executed by the DSP 16. The compiled code can be passed to the dynamic cross linker 142 for immediate use in the DSP 16, or could be saved in the DSP library 118.

The dynamic cross linker 142 accepts previously unlinked code, which is either (1) statically stored in connection with the host processor 12 or (2) dynamically downloaded to the host processor 12 over a network connection (including global networks such as the Internet) or (3) dynamically generated by the dynamic cross compiler 140. The dynamic cross linker 142 links the input code for a memory starting address of the DSP 16 determined at runtime. The memory starting address can be determined from a memory map or memory table stored on and managed by either the host processor 12 or DSP 16. The dynamic cross linker 142 convert referenced memory locations in the code to actual memory locations in the DSP. These memory locations could include, for example, branch addresses in the code or references to locations of data in the code.

In the preferred embodiment, the portable code is in a COFF (common object file format) which contains all information about the code, including whether it is linked or unlinked. If it is unlinked, symbol tables define the address which must be changed for linking the code.

The conversion process described above has several significant advantages over the prior art. First, the dynamic cross compiler 140 allows run-time decisions to be made about where to execute the downloaded portable code. For example, in a system with multiple target processors (such as two DSPs 16), the dynamic cross compiler 140 could compile the portable code to any one of the target processors based on available resources or capabilities. The dynamic cross linker 142 provides for linking code to run on a target processor which does not support relocatable code. Since the code is linked at run-time, memory locations in the DSP 16 (or other target processor) do not need to be reserved, allowing optimum efficiency of use of all computing resources in the device. Because the compiling is accomplished with knowledge of the architecture of the platform 10, the compiling can take advantage of processor and platform specific features, such as intelligent cache architectures in one or both processors.

Thus, the DSP 16 can have various functions which are changed dynamically to fully use its processing capabilities. For example, the user may wish to load a user interface including voice recognition. At that time, the host processor could download software and dynamically cross compile and cross link the voice recognition software for execution in the DSP 16. Alternatively, previously compiled software in the DSP library 118 could be dynamically cross linked, based on the current status of the DSP 16, for execution.

Figures 7A, 7B, 8A, 8B, 9:
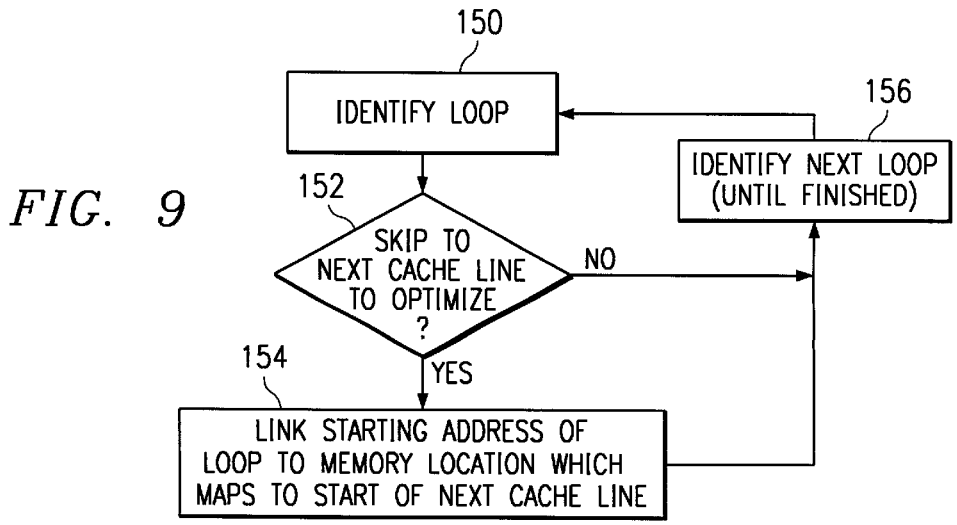
FIGS. 7a–b illustrate a example of optimization of a seven word loop for a cache architecture using four word cache lines.
FIGS. 8a–b illustrate a example of optimization of a four word loop for a cache architecture using four word cache lines.
FIG. 9 illustrates a flow chart describing optimization of a cache line using a linking subsystem.

Additionally, the dynamic cross linker 142 can link code such that the efficiency of cache architecture 50 is maximized. FIG. 7a illustrates a problem which can reduce the efficiency of a cache. In FIG. 7a, a seven word program loop is stored in the cache. Once the loop is copied to the data array 54 from the main memory, the program loop begins at address n+2 of the data array 54 and ends at address n+8, thus occupying three cache lines. After executing instruction "7" (inst7), the program loops to instruction "1" (inst1). If this loop were executed one hundred times, there would be 700 cache memory accesses to the data array 56 for a cache without the disabling capabilities described above and 300 cache access to the data array 56 using the disabling circuitry described in connection with FIGS. 3–4.

As shown if FIG. 7b, the program code of the loop is linked such that the number of cache lines is minimized. In this case, rather than beginning the loop at address n+2, the loop is started at address n+4. While this wastes two memory locations, reduces the number of cache accesses of the data array 56 to 200 when the disabling circuitry is used.

Further, optimizing the location of a programming loop can reduce the number of cache misses. Each time there is a miss, a new block of instructions or data must be transferred from main memory to the cache. When the cache is full, the new block must replace an existing block into the cache. A system that uses less lines to hold the loop, for a given cache size, will therefore reduce the probability of a miss.

A more dramatic example is shown in FIGS. 8a and 8b, where a four word loop is shown. In the example of FIG. 8a, where the loop begins at address n+1 and ends at address n+4, two cache lines are used to contain the loop. If this loop were executed one hundred times, the data array would be accessed 400 times if the disabling circuitry were not used and 200 times if the disabling circuitry were used. By contrast, if the program loop was aligned as shown in FIG. 8b, with the loop beginning at address n and ending at position n+3, only one memory access to the data array would be necessary, with all other address requests being serviced by accessing data already stored in the output buffer of the data array 56 while the DIS signal is active.

This technique is particularly important in relation to digital signal processors, where loops are often only a few instructions long.

FIG. 9 illustrates a flow chart which describes an embodiment for linking code in order to optimize the efficiency of the cache architecture 56. In block 150, a loop is identified. There are a number of ways that the existence of a loop in the code could be determined. First, there a generally only a few looping constructs within a language. These could be readily identified in the compiled code. Second, if the COFF format (or similar format) is used, the information for identifying loops can be included as part of the compiled code.

In block 152, the dynamic linker 142 determines whether the start of a program loop will need to move to the start of the next cache line for optimization (block 154). A loop will need a number of lines equal to N/L (where N is the number of words in the loop and L is the number of words in a line of the data array 56) plus an additional line if the remainder of N/L (i.e., N mod L) is not equal to zero. For optimization purposes, if N mod L=0 then the first word of the loop must begin at the first word of the cache line. Otherwise, if N mod L>0, then the loop must begin at or before the L–(N mod L) word position in the data array (where the word positions are ordered as 0,1,2,3 ... L–1). Thus, for example, using a four word cache line as shown in FIG. 3, a six instruction loop would have to begin at least by word position "2" in the cache line, but could also be at position "0" or " position "1".

If the start of a program loop would otherwise map to a position in the cache which is not optimal, then the dynamic linker 142 will map the instruction to a memory location which is associated with the start of the next cache line in block 156. On the other hand, if the program loop maps to a position which maintains a minimum number of lines for the loop, then the loop does not need to be moved, and the next program loop can be identified, until all loops have been found.

Optimizing a loop can result in a memory waste of up to L–1 word locations. Thus, it may be desirable to prioritize which loops are optimized. For example, a loop which is only repeated twice may not be worth optimizing if memory conservation is important. Prioritization information may be derived from the code information in the same way as the loops are identified. First, the code will, in many cases, identify the number of times a loop is repeated. Second, priority labels could be included in the COFF (or similar) format to identify which loops should be optimized. Whether to optimize low priority loops could be based, for example, on the available memory.

This aspect of the present invention provides significant advantages over the prior art. First, significant amounts of energy can be saved by reducing tag searches and data array accesses, as described above. Second, the speed can be significantly enhanced by reducing memory accesses. Third, cache misses can be reduced.

While the present invention has been described in connection with a cross-linker for optimizing code on a DSP or other coprocessor, it should be noted that the optimization could be used for any processor or coprocessor, wherever an efficient cache system is desired.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A method of executing a program in a processing circuit including a main memory and a cache memory, said cache memory comprising a plurality of data lines, each data line storing a plurality of data words, comprising the steps of:

identifying one or more programming loops within compiled code for the program;

linking the program to said main memory, such that a minimum number of cache lines are used to store each programming loop.

2. The method of claim 1 wherein said step of identifying one or more programming loops comprises the step of evaluating said compiled code for looping constructs.

3. The method of claim 1 wherein said step of identifying one or more programming loops comprises the step of identifying labels in information associated with the compiled code.

4. The method of claim 3 wherein said information comprises header information in a common object file format (COFF) header.

5. The method of claim 1 wherein said linking step comprises the step of moving an identified programming loop to start at a memory location associated with a first word in a cache line.

6. The method of claim 1 and further comprising the step of prioritizing programming loops.

7. The method of claim 6 wherein said prioritizing is based on the number of times a programming loop is repeated.

8. A processing device comprising:

a main memory;

a cache memory coupled to said main memory;

a processor for identifying program loops in compiled code for a program and linking said program loops to said main memory such that said program loops are stored in said cache memory in a minimum number of cache memory lines.

9. The processing device of claim 8 wherein said processor identifies one or more programming loops by evaluating said compiled code for looping constructs.

10. The processing device of claim 8 wherein said processor identifies one or more programming loops by identifying labels in information associated with the code.

11. The processing device of claim 10 wherein said information comprises header information in a common object file format (COFF) header.

12. The processing device of claim 8 wherein said processor links program loops to memory by linking an identified programming loop to start at a memory location associated with a first word in a cache line.

13. The processing device of claim 8 wherein said processor prioritizes programming loops to determine which programming loops will be moved to another location in memory.

14. The processing device of claim 13 wherein said prioritizing is based on the number of times a programming loop is repeated.

15. The processing device of claim 8 wherein said processor comprises a first processor and further comprising a second processor for executing the programming loop after linking by said first processor.

16. The processing device of claim 15 wherein said second processor comprises a digital signal processor.

17. The processing device of claim 15 and wherein said first processor accesses non-compiled code and generates unlinked compiled code for the second processor from which the program loops are identified.

18. The processing device of claim 17 wherein said first processor generates unlinked compiled code from a portable non-compiled code.

19. The processing device of claim 17 wherein said portable non-compiled code is JAVA.

20. A processing device comprising:

a main memory;

a digital signal processor having an associated cache;

a cache memory coupled to said main memory; and a general processor for generating unlinked compiled code for said digital signal processor from a portable non-compiled program code, for identifying programming loops in said unlinked compiled code and for linking said program loops to said main memory such that said program loops are stored in said cache memory associated with the digital signal processor in a minimum number of cache memory lines.

* * * * *